(12) United States Patent
Verros

(10) Patent No.: US 9,150,135 B1
(45) Date of Patent: Oct. 6, 2015

(54) COUPLING MEMBER FOR SIDE DUMP TRAILER

(71) Applicant: James M. Verros, Elk Point, SD (US)

(72) Inventor: James M. Verros, Elk Point, SD (US)

(73) Assignee: Smithco Mfg., Inc., LeMars, IA (US)

( * ) Notice: Subject to any disclaimer, the term of this patent is extended or adjusted under 35 U.S.C. 154(b) by 0 days.

(21) Appl. No.: 14/252,363

(22) Filed: Apr. 14, 2014

Related U.S. Application Data

(63) Continuation of application No. 13/597,495, filed on Aug. 29, 2012, now Pat. No. 8,757,728.

(51) Int. Cl.
*B60P 1/16* (2006.01)

(52) U.S. Cl.
CPC .................................. *B60P 1/165* (2013.01)

(58) Field of Classification Search
CPC ............ B60P 1/16; B60P 1/162; B60P 1/165; B60P 1/30; B65G 67/42
USPC ......... 298/17.5, 17.6, 17.7, 18, 22 R; 92/161; 403/31, 400
See application file for complete search history.

(56) References Cited

U.S. PATENT DOCUMENTS 2,856,232 A * 10/1958 Mentes ........................ 298/17.7
2,953,408 A *  9/1960 Koenig

* cited by examiner

*Primary Examiner* — Stephen Gordon
(74) *Attorney, Agent, or Firm* — G. Brian Pingel; David M. Breiner; Camille L. Urban

(57) ABSTRACT

Example embodiments disclose a coupling device that includes a support member and a pivot member. The support member may include a first wall, a second wall a third wall, and a fourth wall. The pivot member may be pivotally supported in the support member. In example embodiments, the pivot member may include a first stanchion penetrating the first wall and a second stanchion penetrating the second wall. In example embodiments the support member may further include one of a third stanchion on the third wall and a first aperture in the third wall and one of a fourth stanchion on the fourth wall and a second aperture in the fourth wall.

10 Claims, 22 Drawing Sheets

COUPLING MEMBER FOR SIDE DUMP TRAILER

CROSS-REFERENCE TO RELATED APPLICATION

This application is a continuation of U.S. patent application Ser. No. 13/597,495, filed with the United States Patent and Trademark Office on Aug. 29, 2012, which issued as U.S. Pat. No. 8,757,728 on Jun. 24, 2014, the entire contents of each of which is herein incorporated by reference.

BACKGROUND

1. Field

Example embodiments relate to a coupling member. In particular, example embodiments are drawn to a coupling member useable with a high volume side dump trailer.

2. Description of the Related Art

FIG. 1A is view of a coupling member 10 supporting a hydraulic cylinder 20. As shown in FIG. 1A, the hydraulic cylinder 20 comprises a barrel 22 and a rod 24. In FIG. 1, the barrel 22 of the hydraulic cylinder 20 is inserted into a sleeve 26 of the coupling member 10. In the conventional art, the sleeve 26 is welded to the barrel 22. Thus, the sleeve 26 and the barrel 22 are rigidly connected to one another. In the conventional art two stanchions 28 (only one of which is shown in FIG. 1A) are connected to the sleeve 26. The stanchions 28, resemble short cylinders welded to the sleeve 26. The stanchions 28 protrude through holes provided in the coupling member 10. In the conventional art, the holes of the coupling member 10 through which the stanchions 28 protrude are slightly larger than the stanchions 28. Thus, while the hydraulic cylinder 20 is supported by the coupling member 10 via the stanchions 28 and the sleeve 26, the hydraulic cylinder 20 may rotate with respect to the coupling member 10. In the conventional art, the coupling member 10 may be used to couple the hydraulic cylinder 20 to an external structure, for example, a dump truck.

In the conventional art the coupling member 10 is comprised of four plate type elements 12, 14, 16, and 18 which form a tube shaped structure. FIG. 1B illustrates the coupling member 10 rigidly connected to a first member 40 and a second member 50 of an external structure. For example, in the conventional art, the coupling member 10 is welded to the first and second members 40 and 50 of the external structure. In the conventional art end plate type elements 12 and 14 may be omitted as they may be integrally formed with the first and second members 40 and 50 of the external structure.

In the conventional art, the sleeve 26 may rotate with respect to the third and fourth type elements 16 and 18. That is, the sleeve 26 may rotate about the Y' axis without imparting stresses on the four plate type elements 12, 14, 16, and 18. In the conventional art, however, if the first member 40 of the external structure were to twist, that is, rotate about the X' axis as shown in FIG. 1B, significant stresses may be imparted to the four plate type elements 12, 14, 16, and 18. Thus, in the conventional art, the first member 40 and the second member 50 are often built up or reinforced to prevent the twisting motion.

FIG. 2A illustrates a back view of a side dump trailer 100* which implements an embodiment of the conventional coupling member 10. The side dump trailer 100* is used to transport a tub 110* that is attached to the side dump trailer 100* at a pivot point 120*. The side dump trailer 100* further includes a hydraulic cylinder 130* attached to the back end of the side dump trailer 100* by a bracket 140* and a cross frame 150* which in turn is connected to framing members 155* and 157* of the side dump trailer 100*. A barrel 132* of the hydraulic cylinder 130* is fitted with stanchions 134* which protrude through holes formed in the cross frame 150*. The holes formed in the cross frame 150* are slightly larger than the stanchions 134*. Thus, the hydraulic cylinder 130* may be rotated with respect to the cross frame 150*. In this particular example, the cross frame 150* and the framing members 155* and 157* are analogous the coupling member 10 of FIG. 1. In other words, the cross frame 150* may be analogous to the side members 16 and 18 and the framing members 155* and 157* may be analogous to the side members 12 and 14.

FIG. 2B illustrates the side dump trailer 100* with the hydraulic cylinder 130* extended thus allowing a rod 136* of the hydraulic cylinder 130* to be seen. Because of the manner in which the hydraulic cylinder 130* is attached to the cross frame 52* (via the stanchions 134*) the hydraulic cylinder 130* may rotate with respect to the cross frame 150* as the tub 110* is tilted.

SUMMARY

Applicants have discovered that side dump trailers may be prone to excessive twisting when they are relatively long and/or a load they are carrying is relatively high. The twisting may impart a significant torsion load to members connected to the trailer, such as conventional cross frames connecting a hydraulic cylinder to the trailer. Example embodiments of the invention may reduce torsional loads on coupling members resulting in reduced stresses in the coupling members and an increased service life.

Example embodiments relate to a coupling member. In particular, example embodiments are drawn to a coupling member useable with a side dump device.

In accordance with example embodiments, a coupling device may include a support member and a pivot member. The support member may include a first wall, a second wall a third wall, and a fourth wall. The pivot member may be pivotally supported in the support member. In example embodiments, the pivot member may include a first stanchion penetrating the first wall and a second stanchion penetrating the second wall. In example embodiments the support member may further include one of a third stanchion on the third wall and a first aperture in the third wall and one of a fourth stanchion on the fourth wall and a second aperture in the fourth wall.

In accordance with example embodiments, a system may include a first structure, a second structure, and a coupling device supported by the first structure and the second structure, wherein the coupling device is configured to pivot between the first structure and the second structure.

In accordance with example embodiments, a side dump trailer may include a tub, a first structure on the tub, a second structure on the tub, a coupling device supported by the first structure and the second structure, wherein the coupling device is configured to pivot between the first structure and the second structure, and an actuator attached to a frame of the side dump trailer and supported by the coupling device.

BRIEF DESCRIPTION OF THE DRAWINGS

Example embodiments are described in detail below with reference to the attached drawing figures, wherein:

FIGS. 3B-2 is a top view of the pivot member in accordance with example embodiments;

FIGS. 3B-3 is a first side view of the pivot member in accordance with example embodiments;

FIGS. 3B-4 is a second side view of the pivot member in accordance with example embodiments;

FIGS. 3C-1 is an isometric view of a support member in accordance with example embodiments;

FIGS. 3C-2 is a top view of the support member in accordance with example embodiments;

FIGS. 3C-3 is a first side view of the support member in accordance with example embodiments;

FIGS. 3C-4 is a second side view of the support member in accordance with example embodiments;

FIGS. 4C-1 and 4C-2 are views of the coupling device in accordance with example embodiments wherein a pivot member is rotated to different positions;

DETAILED DESCRIPTION

Figure 1A:
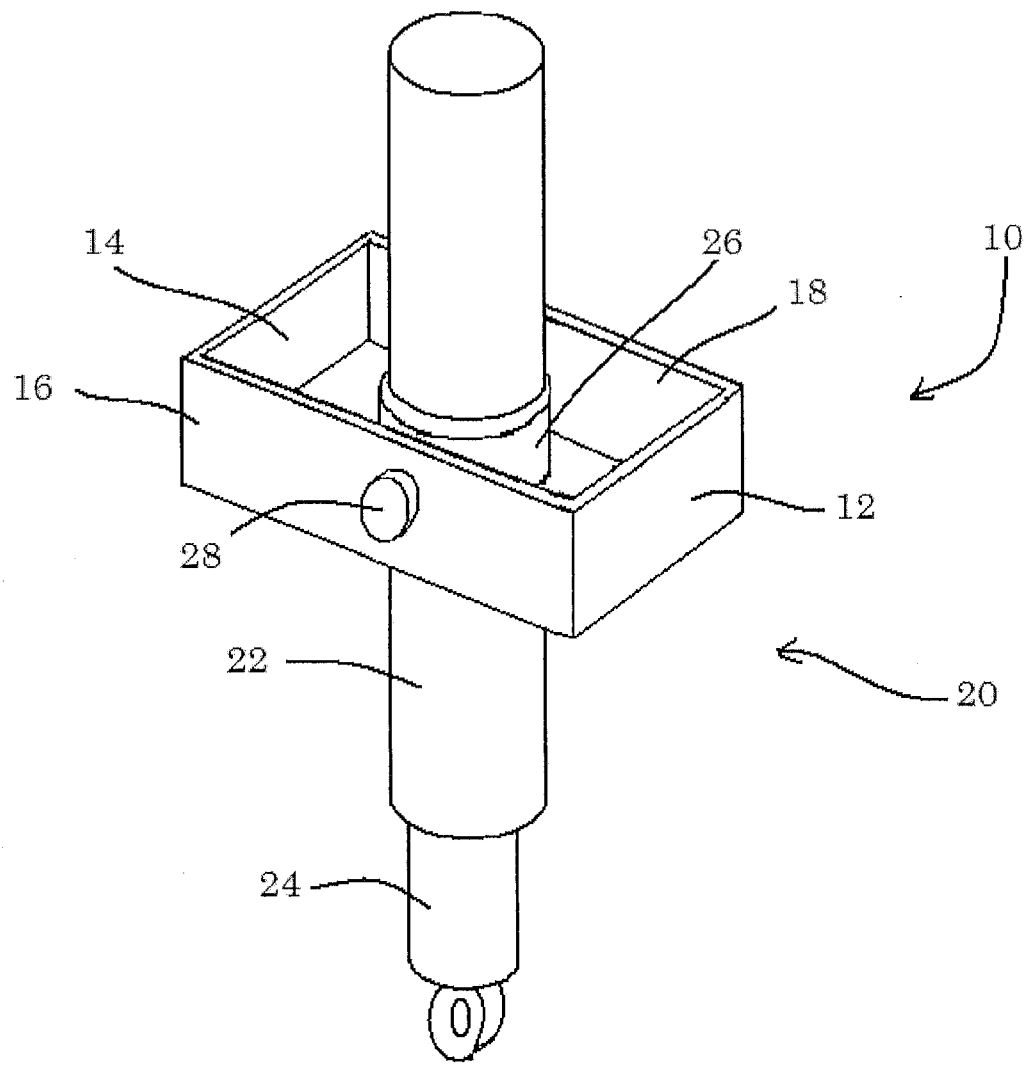
FIGS. 1A and 1B are views of a conventional hydraulic cylinder supported by a conventional coupling member.
Figure 1B:
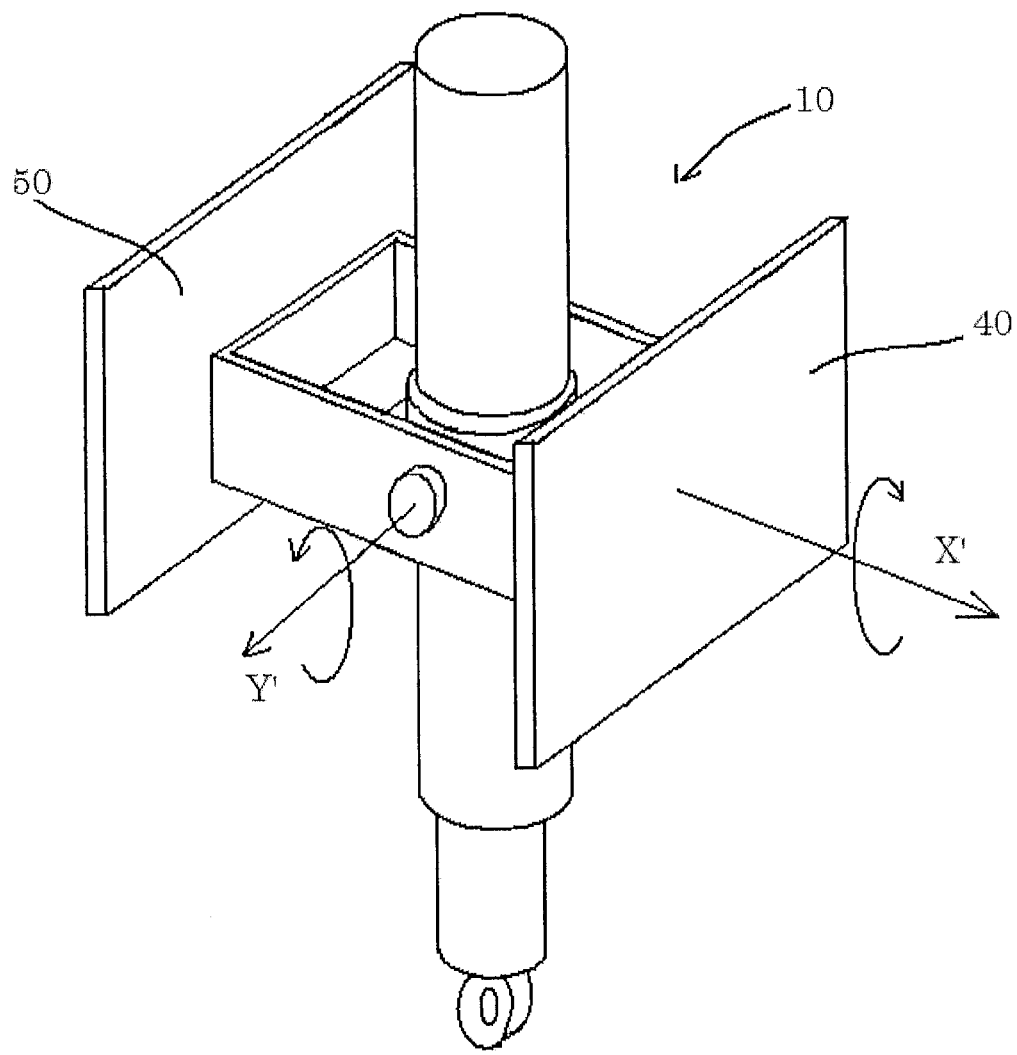
Figure 2A:
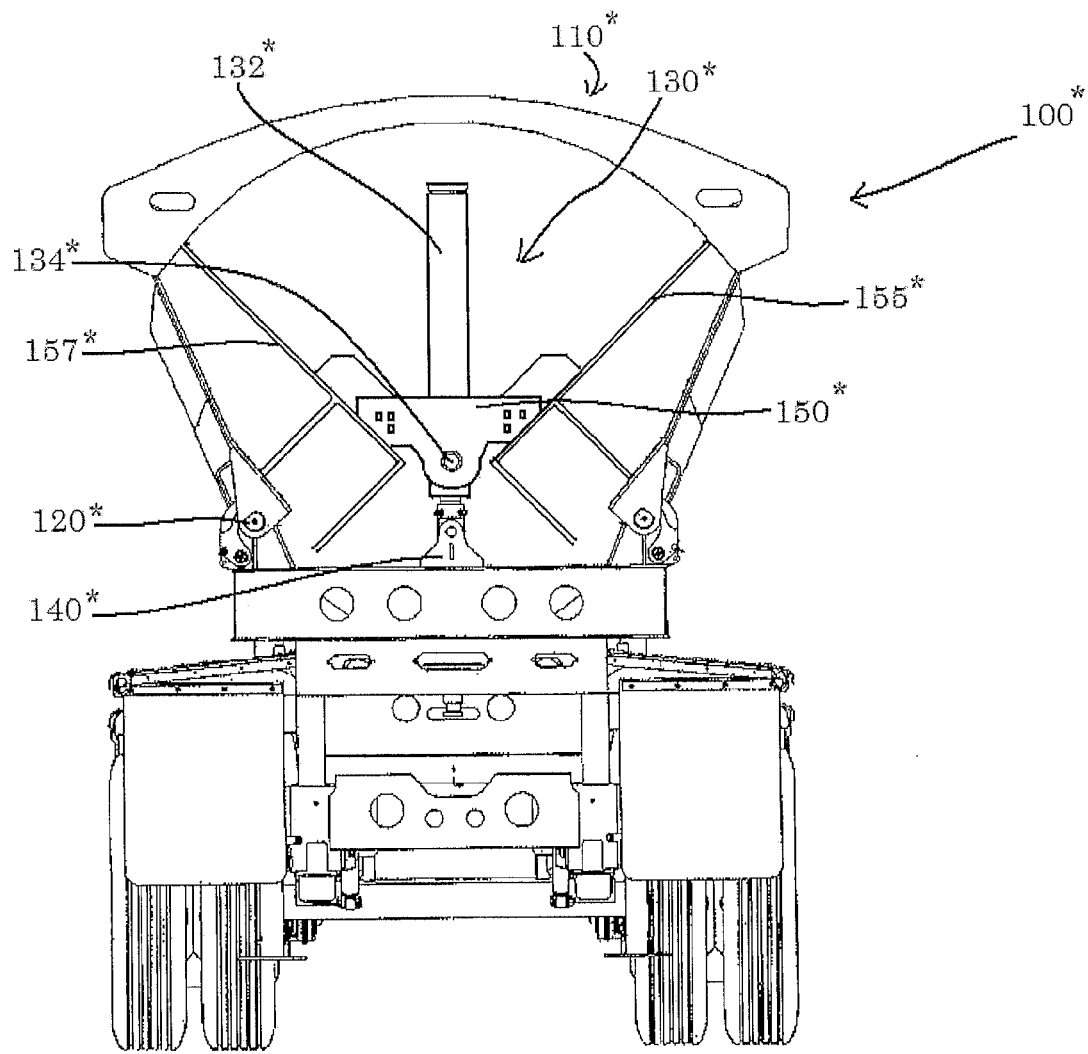
FIGS. 2A-2B are views of a conventional side dump trailer using the conventional coupling member to support a hydraulic cylinder used to rotate a tub of the conventional side dump trailer.
Figure 2B:
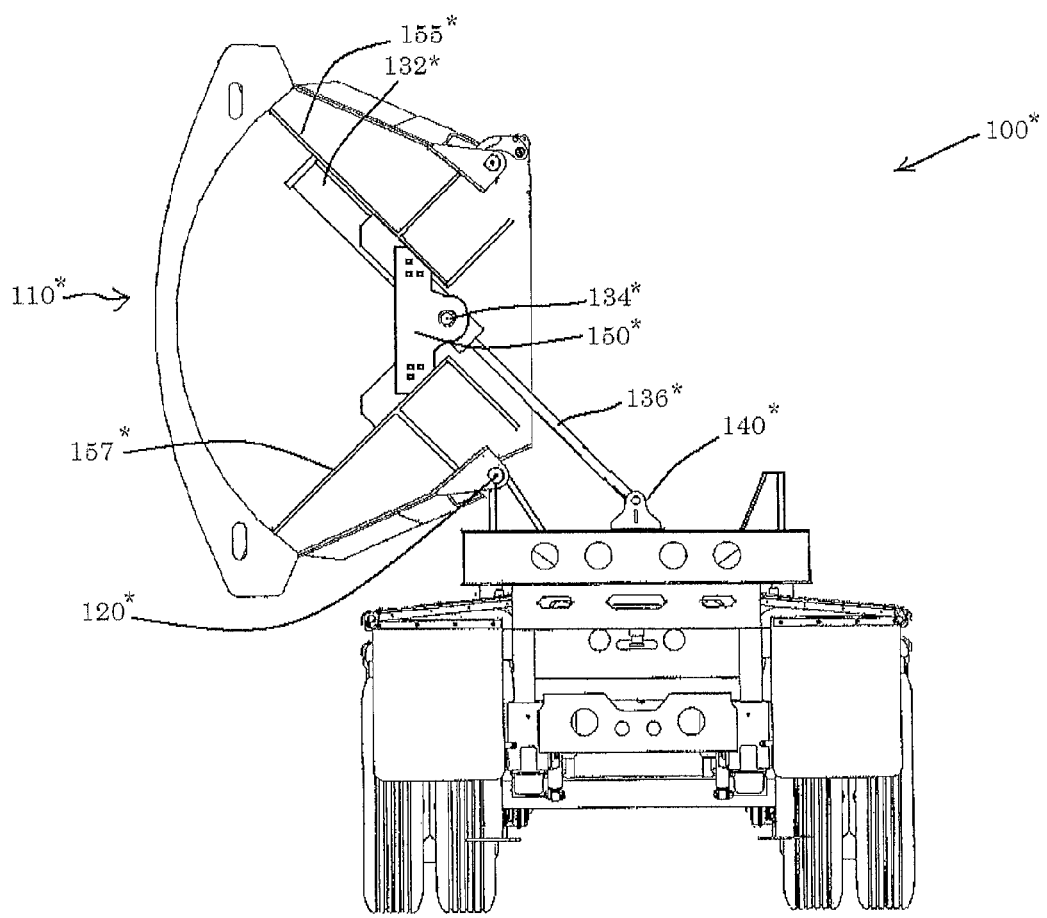

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a coupling device useable with at least a high volume side dump trailer.

Figure 3A:
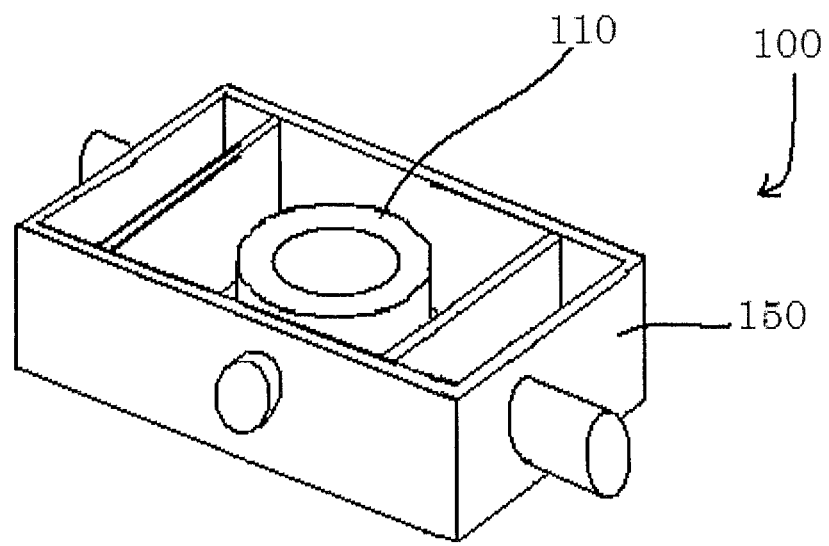
FIG. 3A is a view of coupler in accordance with example embodiments.

FIG. 3A is a view of a coupling device 100 in accordance with example embodiments. As shown in FIG. 3A, the coupling device 100 may include a pivot member 110 pivotally connected to a frame 150 (an example of a support member). In example embodiments, the pivot member 110 may include a body 112 that resembles a hollow cylinder having an inner diameter D1 and an outer diameter D2, as shown in FIGS. 3B-1, 3B-2, 3B-3, and 3B-4. The pivot member 110 may also include a first stanchion 114 and a second stanchion 116 connected to, or protruding out of, outside surfaces of the body 112. For example the first stanchion 114 may resemble a short cylinder having an outside diameter D3 and the second stanchion 116 may resemble a short cylinder having an outside diameter D4. In example embodiments, an axis of the first stanchion 114 and an axis of the second stanchion 116 may be substantially coaxial. Thus, the pivot member 110 may rotate about a line passing through the axes of the first and second stanchions 114 and 116.

In example embodiments the first and second stanchions 114 and 116 are illustrated as short solid cylinders, however, example embodiments are not limited thereto. For example each of the first and second stanchions 114 and 116 may be hollow, substantially hollow, or partially hollow cylinders. Furthermore, the first and second stanchions 114 and 116 may, alternatively, be semi-cylindrical in shape. In addition, example embodiments are not limited to stanchions being attached to outside surfaces of the body 112. For example, the first stanchion 114, the second stanchion 116, and the body 112 may be integrally formed as a single body from a casting process. In the alternative, each of the first stanchion 114, the second stanchion 116, and the body 112 may be separately formed and then connected together through at least one of welding, riveting, bolting, screwing, clamping, and pinning.

Figures 1, 3B:
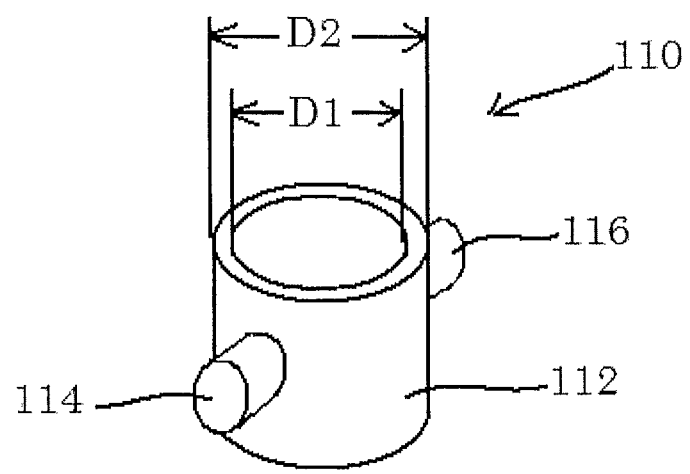
FIGS. 3B-1 is an isometric view of a pivot member in accordance with example embodiments.
Figures 2, 3B:
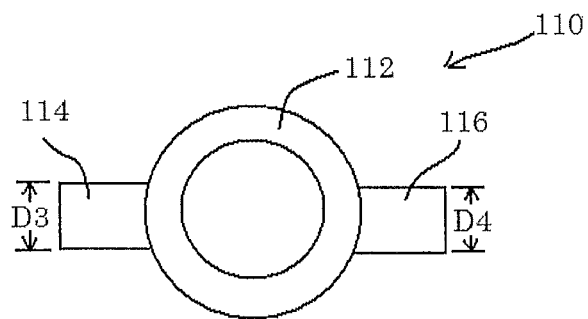
Figures 3, 3B:
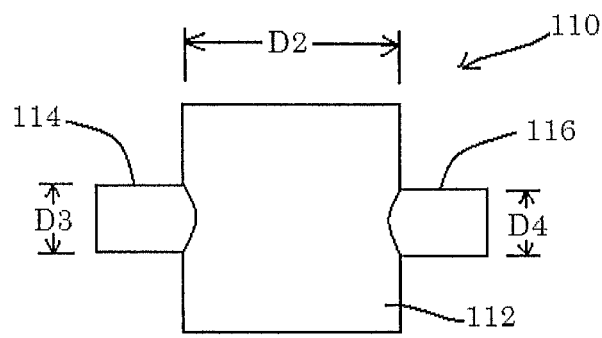
Figures 3, 3B, 4:
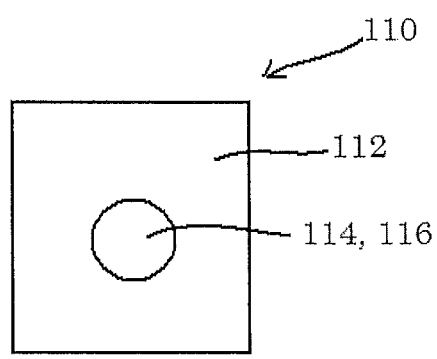
Figures 1, 3C:
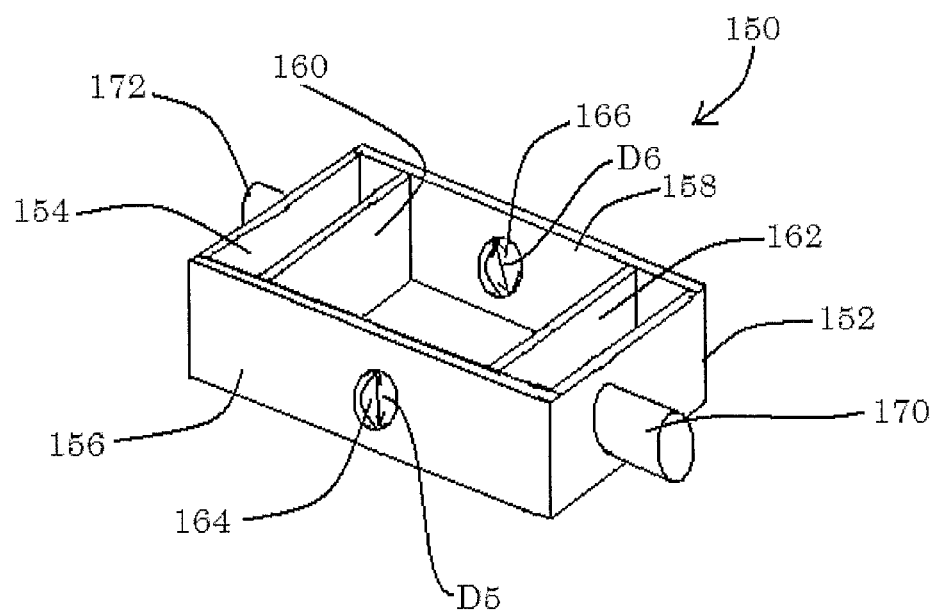
Figures 2, 3C:
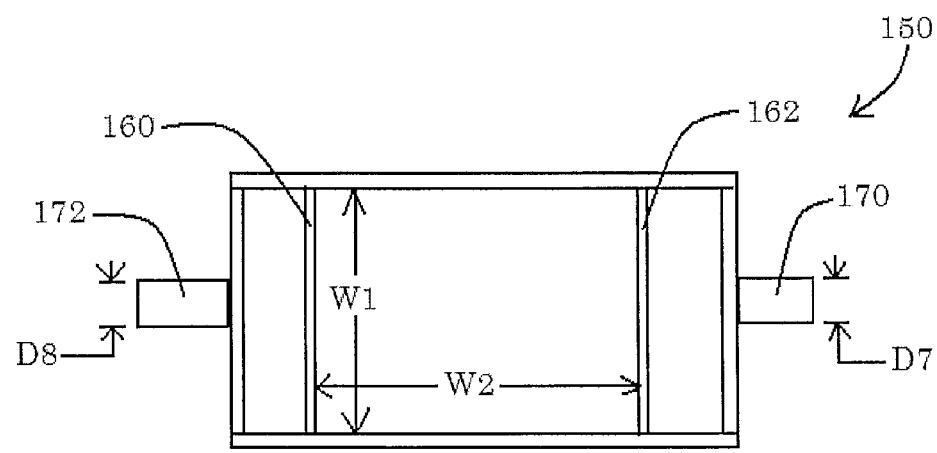
Figures 3, 3C:
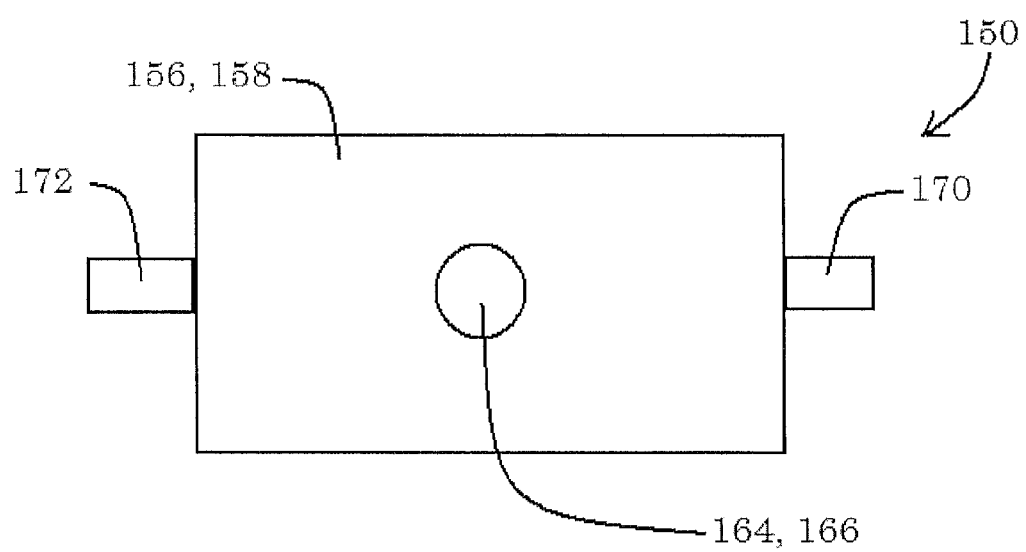
Figures 3, 3C, 4:
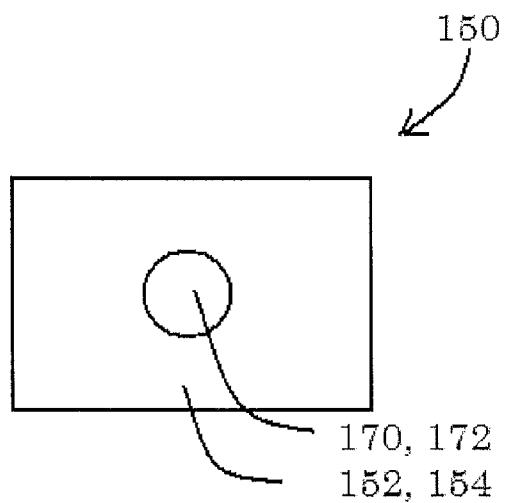

In example embodiments, the frame 150 may resemble a tube type frame as shown in at least FIG. 3C-1. The frame 150, for example, may include a first wall 152, a second wall 154, a third wall 156, and a fourth wall 158 forming a substantially rectangular tube. In example embodiments stiffeners 160 and 162 may be provided to reinforce the frame 150. In example embodiments, the frame 150 may be formed from plate type elements, for example, metal plates, which are then welded together to form the frame 150. In the alternative, the frame 150 may be a single member formed from a casting process. The stiffeners 160 and 162 may likewise be plate type members that are welded to the frame 150. In the alternative, the stiffeners 160 and 162 may be formed integral with the first, second, and third walls 152, 154, 156, and 158 as part of the casting process.

In example embodiments the third wall 156 may include a first aperture 164 which may resemble a circular hole having a diameter D5. In example embodiments the first stanchion 114 of the pivot member 110 may be inserted into the first aperture 164 thus, the diameter D5 of the first aperture 164 may be substantially the same as, or slightly larger than, the outer diameter D3 of the first stanchion 114. Similarly, the fourth wall 158 may include a second aperture 166 which may resemble a circular hole having a diameter of D6. In example embodiments, the second stanchion 116 may be inserted into the second aperture 166. Thus, the diameter D6 of the second aperture 166 may be about the same as, or slightly larger than diameter D4 of the second stanchion 116.

In example embodiments, the pivot member 110 may be supported inside of the frame 150. Thus, a width W1 of the frame 150 may be about the same as, or larger than, the outer diameter D2 of the pivot member 110. In example embodiments, the pivot member 110 may be configured to rotate within the frame 150, thus, the stiffeners may be placed at positions which will not interfere, or will minimize or reduce interference, with the pivot member's 110 rotation. In FIGS. 3A-3G the stiffener's 160 and 162 are illustrated as being comprised of vertically oriented plates. Example embodiments, however, are not limited thereto as the stiffeners may have an inclined orientation. In addition, the stiffeners are not limited to flat plates as the stiffeners may alternatively resemble curved plates. Furthermore, example embodiments are not limited by stiffeners being comprised of plates as the stiffeners may resemble another structure. Further, in example embodiments the stiffeners may be omitted. Further yet, there may be only a single stiffener or more than two stiffeners present.

In example embodiments a third stanchion 170 may be attached to one end the frame 150 and a fourth stanchion 172 may be attached to a second end of the frame 150. The third and fourth stanchions 170 and 172 may resemble cylinders having diameters D7 and D8 respectively. In the figures the third and fourth stanchions are illustrated as solid cylinders; however example embodiments are not limited thereto. For example, the third and fourth stanchions 170 and 172 may be hollow, substantially hollow, or partially hollow structures. In example embodiments, the third and fourth stanchions 170 and 172 have axis lines that are substantially coaxial. Thus, in example embodiments, the frame 150 may rotate about a line passing through the axis lines of the third and fourth stanchions 170 and 172.

Figure 3D:
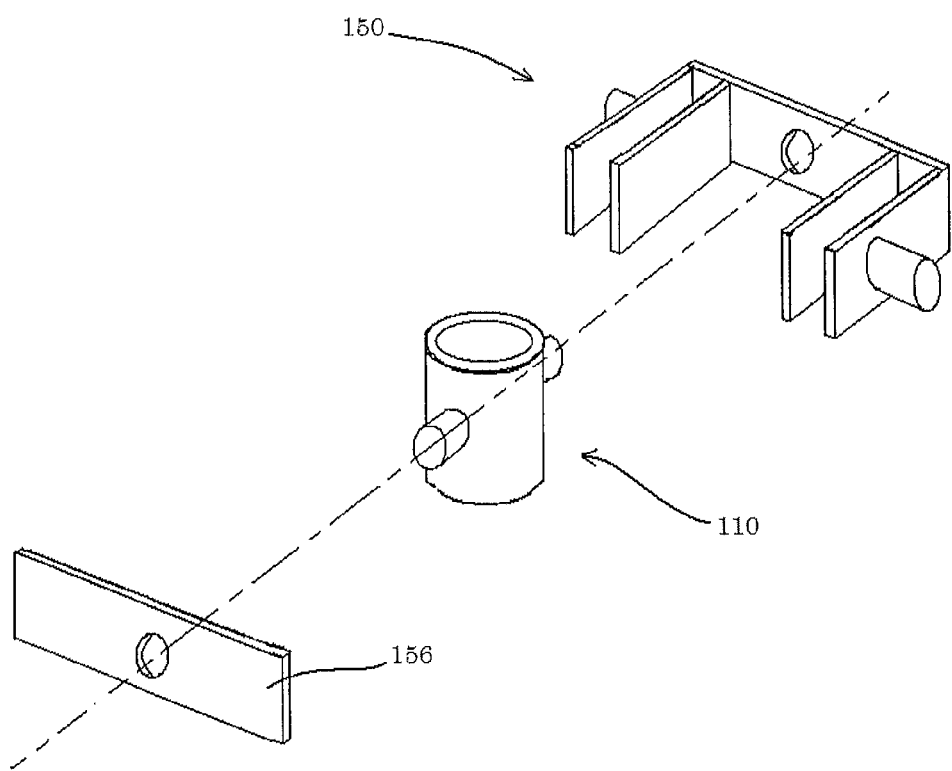
FIG. 3D is an assembly view of coupling device in accordance with example embodiments.

FIG. 3D illustrates a nonlimiting example of the coupling device 100 being assembled. In FIG. 3D the first, second, and fourth walls 152, 154, and 158 have been welded together along with the stiffener plates 160 and 162. In this particular nonlimiting example, third and fourth stanchions 170 and 172 have been welded to outside surfaces of the first and second walls 152 and 154. As stated previously, the third and forth stanchions 170 and 172 are arranged so that their axis lines are substantially coaxial so that the frame 150 may rotate about a line passing through the third and fourth stanchions 170 and 172. In this particular nonlimiting example, the third wall 156 has not yet been attached to the frame 150. Because the frame 150 is open at this point, the pivot member 110 may be inserted into the frame so that the second stanchion 116 is inserted into the second aperture 166 formed in the fourth wall 158. In this position, the third wall 156 may be aligned such that the first aperture 164 formed in the third wall 156 is aligned with the first stanchion 114 of the pivot member 110. The third wall 156 may then be welded to the first, second, and fourth walls 152, 154, and 158 as well as the stiffeners 160 and 162 to form the coupling device 100. In this condition, the each of the first aperture 164, the second aperture 166, the first stanchion 114, and the second stanchion 116 are substantially aligned so that the pivot member 110 may pivot within the frame 150.

Figure 3E:
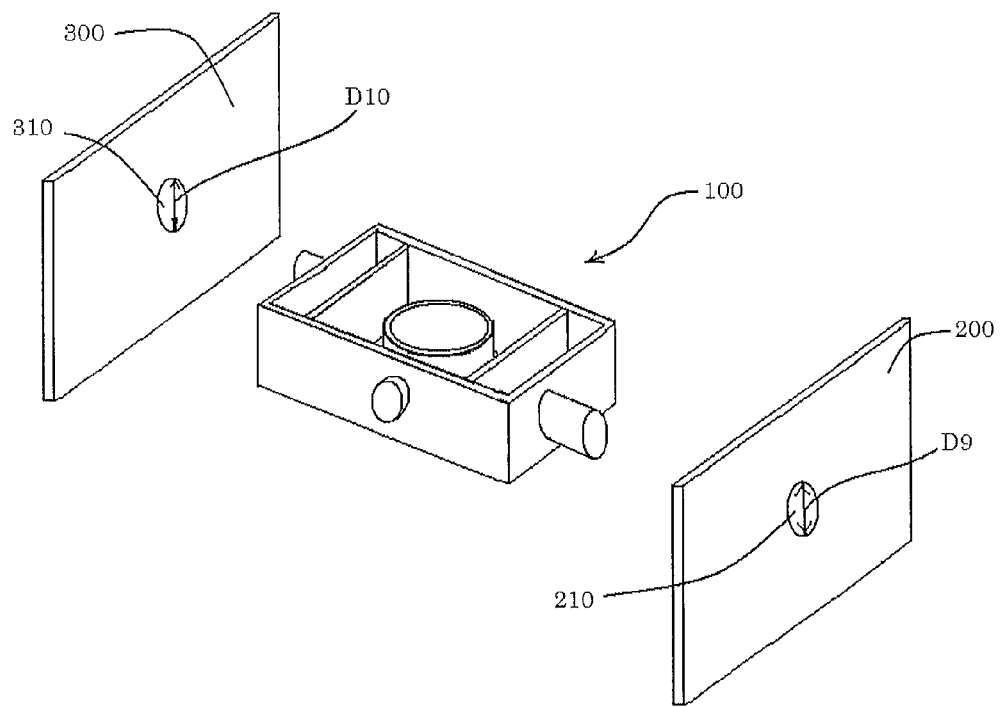
FIG. 3E is a view of the coupling device in accordance with example embodiments and two members of an external structure.

In example embodiments, the coupling device 100 may be attached to an external structure. In example embodiments, the coupling device 100 and the external structure represent an example of a system that uses the coupling device 100. For example, as shown in FIG. 3E, an external structure may include a first plate 200 and a second plate 300. The first plate 200 may include a third aperture 210 and the second plate 300 may include fourth aperture 310. In example embodiments, the third aperture 210 may resemble a circular hole having a diameter D9 and the fourth aperture 310 may resemble a circular hole having a diameter D10. In example, embodiments, the third stanchion 170 of the coupling device 100 may be inserted into the third aperture 210. Thus, the diameter D7 of the third stanchion 170 may be about the same as, or slightly smaller than, the diameter D9 of the third aperture 210. Similarly, the fourth stanchion 172 of the coupling device 100 may be inserted into the fourth aperture 310. Thus, in example embodiments, the diameter D8 of the fourth stanchion 172 may be about the same as, or slightly smaller than, the diameter D10 of the fourth aperture 310.

Figure 3F:
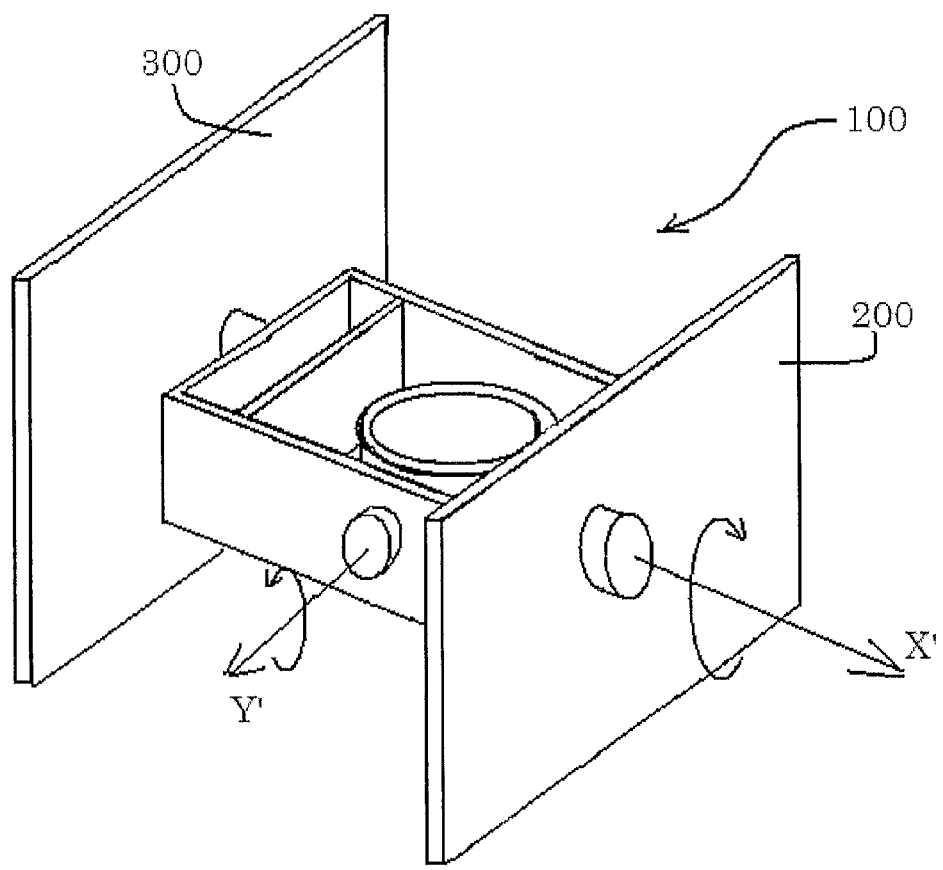
FIG. 3F is a view of the coupling device in accordance with example embodiments supported by the two members of an external structure.

FIG. 3F shows the coupling device 100 coupled with the first and second plates 200 and 300 of the external structure. From a mechanics standpoint, the coupling device 100 is free to rotate about the X' axis illustrated in FIG. 3F and the pivot member 110 of the coupling device 100 is free to rotate about the axis Y' illustrated in FIG. 3F. Thus, the pivot member 110, is able to rotate both about the Y' and X' axis by virtue of its connection to the frame 150 and the frame's 150 connection to the first and second plates 200 and 300. In example embodiments if the first plate 200 of the external structure were to twist about the X' axis, very little to no torsional load would be transferred from to the first plate 200 to the coupling device 100 since the first plate 200 is free to twist about the first stanchion 170 of the frame 150. This is a significant advantage over the prior art in that prior art couplers rigidly connected to plates of external structure would experience a significant loading from the plates in the event the plates twist. Such loads may create severe stresses in the prior art couplers leading to their failure and/or decreased service life. However, because the coupling device 100 of example embodiments includes an extra degree of freedom by virtue of the third and fourth stanchions 170 and 172, the coupling device 100 of example embodiments is less prone to overload.

Figure 3G:
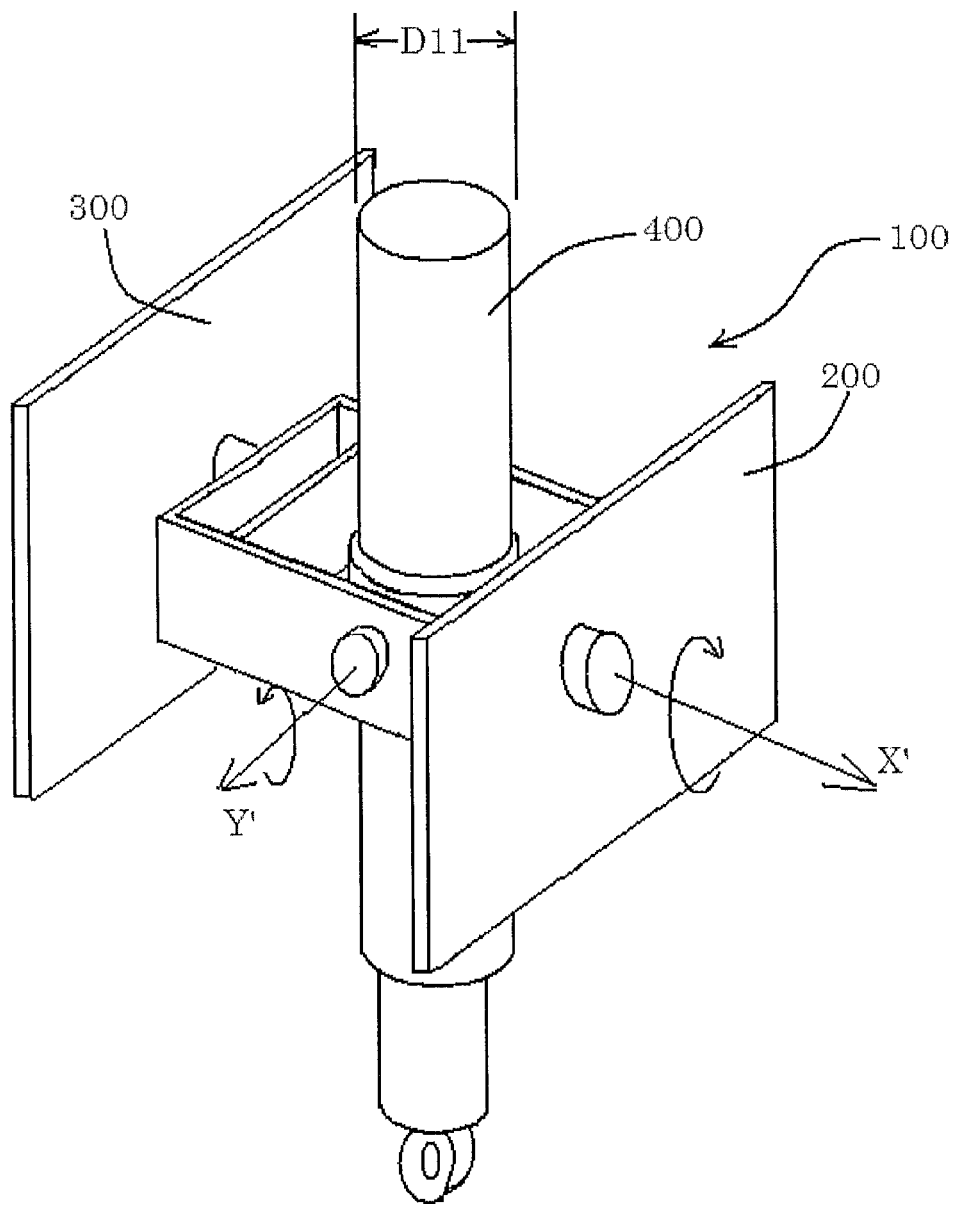
FIG. 3G is a view of the coupling device in accordance with example embodiments supported by the two members of an external structure, the coupling device supporting an actuating device.

FIG. 3G is a view of the coupling device 100 connected to an external structure. In this particular nonlimiting example, the coupling device 100 is connected to an actuating device 400. The actuating device 400 may, for example, be a hydraulic or pneumatic cylinder. For example, the coupling device 100 may have a barrel of a hydraulic cylinder inserted into the pivot member 110. Thus, the body 112 of the pivot member 110 may function as a sleeve in which a standard cylinder may be inserted. In example embodiments, a diameter D11 of the hydraulic cylinder may be substantially the same as, or slightly smaller than, the inner diameter D1 of the pivot member 110. Thus, the barrel of the hydraulic cylinder may be slid into the pivot member 110 of the coupling device 100. Furthermore, the barrel of the actuating device 200 may be secured to the pivot member 110 by welding, clamping, or pinning. Thus, the coupling device 100 may be used to couple an actuating device 400 to an external structure. Although example embodiments illustrate the coupling device 100 as being coupled to a barrel of an actuating device, example embodiments are not limited thereto. For example, the coupling device 100 may, in the alternative, be attached to a rod of the actuating device 400.

It should be emphasized that several features illustrated in the figures are not meant to be limiting. For example, in the figures, the pivot member 100 is illustrated as having a body 112 which is substantially cylinder shaped. Example embodiments, however, are not limited thereto. For example, the body 112 may alternatively be shaped as a square tube, a triangular tube, or a rectangular tube. Furthermore, the body 112 of the pivot member 100 need not be tube shaped. For example, the body 112 may actually resemble a saddle or a half tube shape. Similarly, the frame 150 may be formed with or without the stiffeners 160 and 162. Further yet, pivot member 110 may be omitted altogether. For example, the first and second stanchions 114 and 116 may be welded directly to a supported structure, such as a barrel of a hydraulic cylinder. In addition, the invention is not limited by the aforementioned arrangement. For example, in example embodiments the frame 150 is illustrated as including the third stanchion 170 and the fourth stanchion 172 which penetrate the third aperture 210 and the fourth aperture 310 of the first and second plates 200 and 300. However, rather than providing third and fourth stanchions 170 and 172 on the first and second walls 152 and 154 of the frame 150, the third and fourth stanchions 170 and 172 may be provided on the first plate 200 and the second plate 300, Likewise, rather than providing third and fourth apertures 210 and 310 in the first and second plates 200 and 300, the third and fourth apertures 210 and 310 may be provided in the first and second walls 152 and 154 of the frame 150. Thus, in example embodiments, the first and second plates 200 and 300 may include stanchions that protrude into holes formed in the frame 150 to pivotally support the coupling device 100, Thus far example embodiments provide a coupling device 100 which includes a pivot member 110 pivotally supported on a frame 150. The frame is configured to pivotally connect to an external structure. In example embodiments, the pivot member 110 is illustrated as including first and second stanchions 114 and 116 which protrude through apertures provided in the frame 150. Although the figures provide an example of how the pivot member 110 may be pivotally supported by a frame 150, the above embodiment is merely exemplary and is not meant to limit the invention. In addition, various changes to the above coupling device 100 and external system fall within the scope of the invention.

Figure 4A:
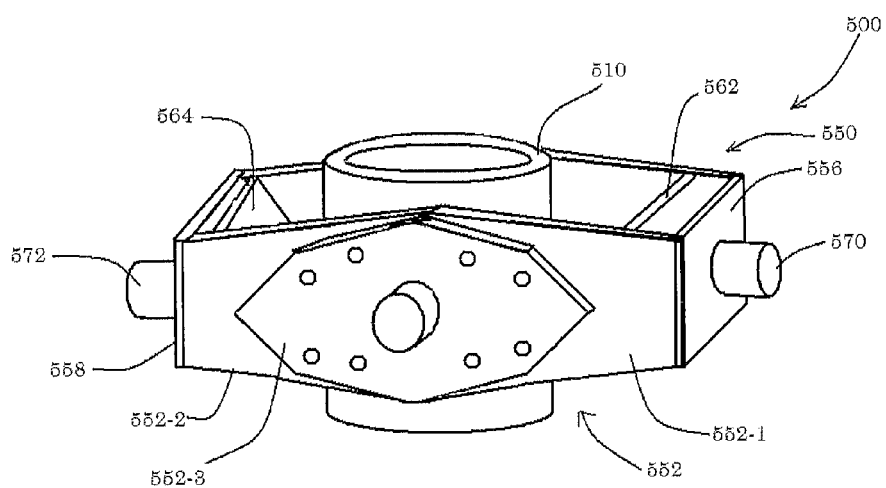
FIG. 4A is view of a coupling device in accordance with example embodiments.

FIG. 4A is another non limiting example of a coupling device 500 in accordance with example embodiments. In example embodiments, the coupling device 500 may include a pivot member 510 and a support member 550. The support member 550, for example, may be a frame type member. In example embodiments, the pivot member 510 may be substantially the same as the previously described pivot member 110, thus a detailed description thereof is omitted for the sake of brevity.

Figure 4B:
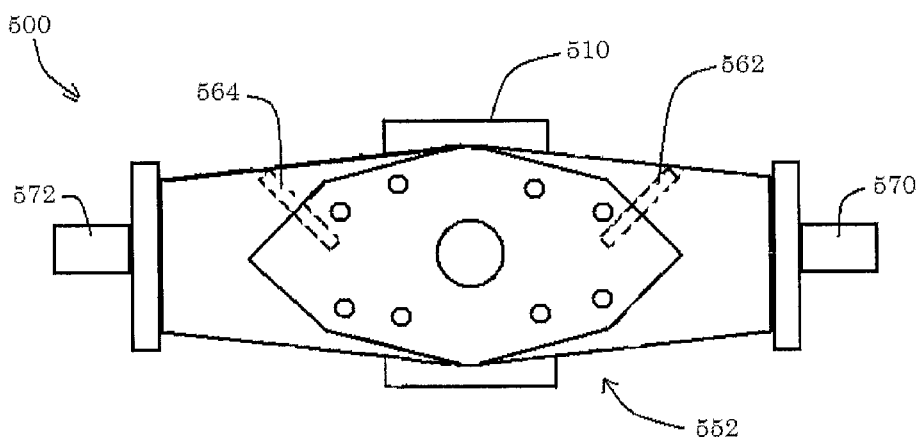
FIG. 4B is a side view of the coupling device in accordance with example embodiments.
Figures 1, 4C:
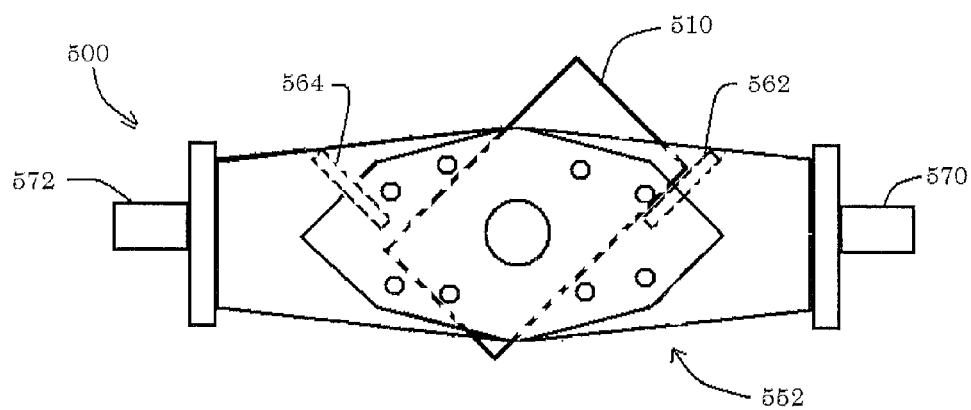
Figures 2, 4C:
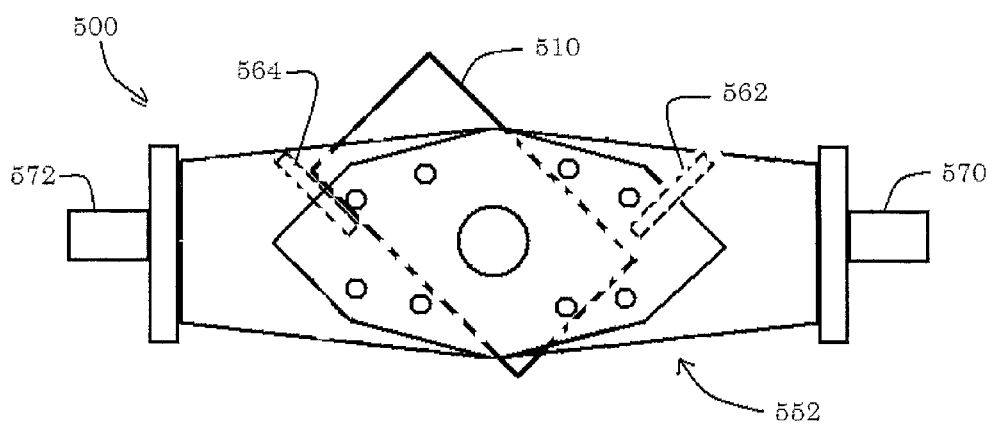
Figure 4D:
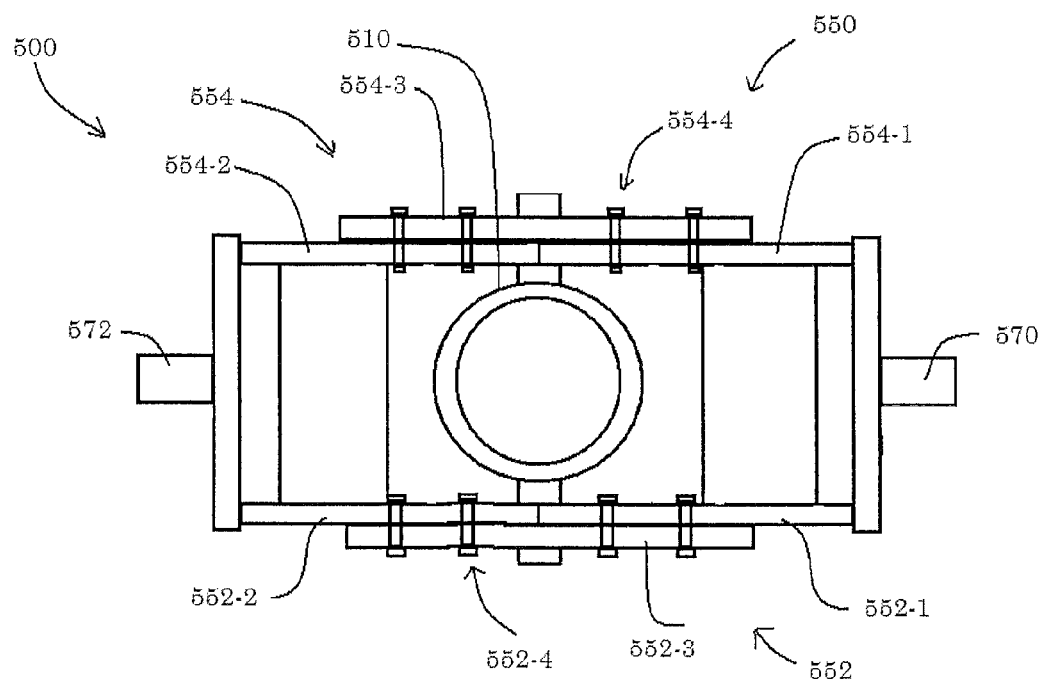
FIG. 4D is a view of the coupling device in accordance with example embodiments.

In example embodiments, the support member 550 may be constructed from several plate type elements which may be bolted and/or welded together. For example, as shown in FIGS. 4A, 4B, and 4C, the support member 550 may include a first wall 552 comprised of a first side plate 552-1, a second side plate 552-2, and a first cover plate 552-3. Each of the first side plate 552-1, the second side plate 552-2, and the first cover plate 552-3 may include a plurality of holes allowing the first side plate 552-1, the second side plate 552-2, and the first cover plate 552-3 to be bolted to one another by a first plurality of bolts 552-4 (see FIG. 4D). In example embodiments the support member 550 may also include a second wall 554 comprised of a third side plate 554-1, a fourth side plate 554-2, and a second cover plate 554-3. Each of the third side plate 554-1, the fourth side plate 554-2, and the second cover plate 554-3 may include a plurality of holes allowing the third side plate 554-1, the fourth side plate 554-2, and the second cover plate 554-3 to be bolted to one another by a second plurality of bolts 554-4.

Figure 4E:
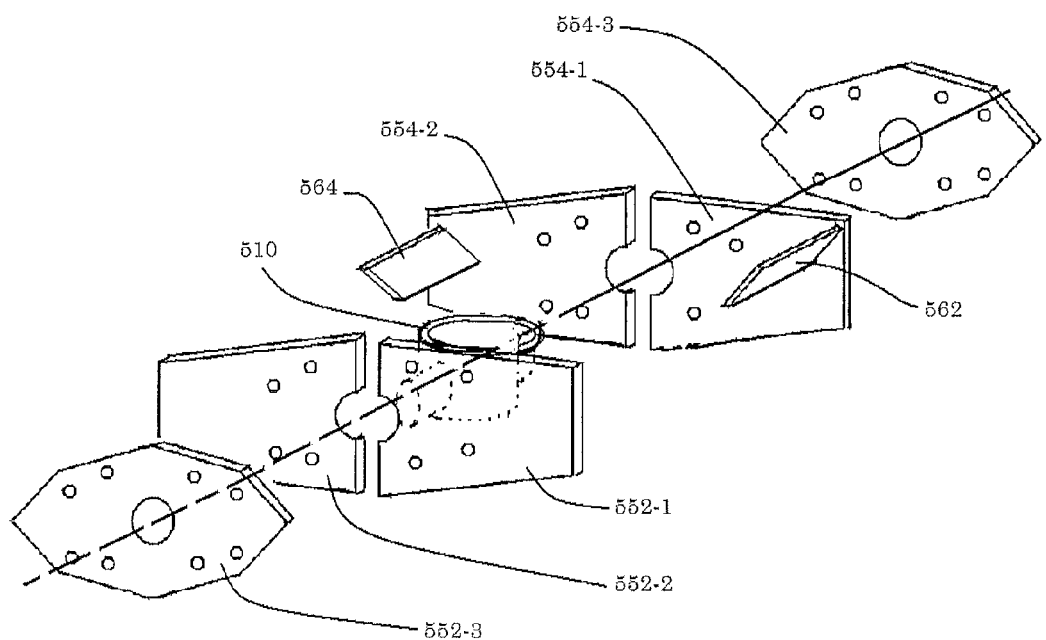
FIG. 4E is a partial exploded view of the coupling device in accordance with example embodiments.
Figure 4F:
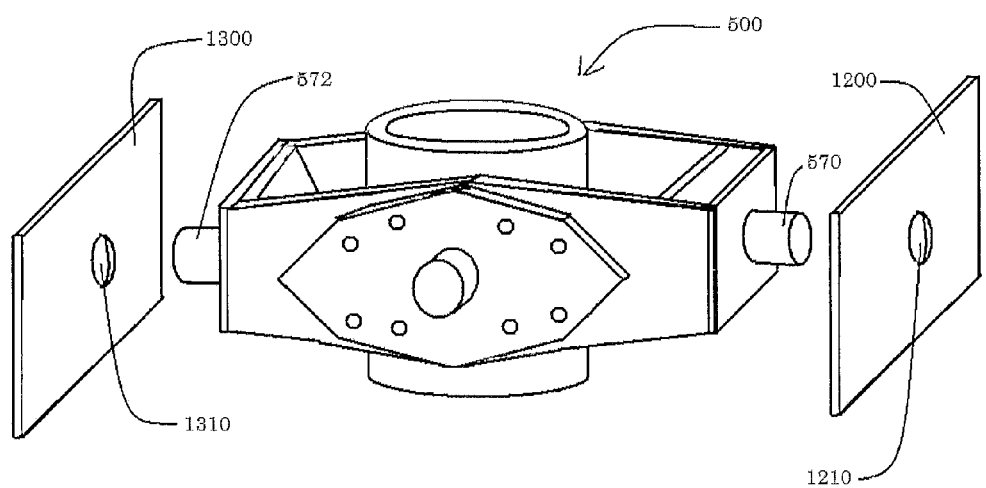
FIG. 4F is a view of the coupling device in accordance with example embodiments and two plates associated with an external structure.

In this particular nonlimiting example embodiment, the first and second cover plates 552-3 and 554-3 may include holes large enough to accommodate stanchions protruding from the pivot member 510. Similarly, the first, second, third, and fourth side plates 552-1, 552-2, 554-1, and 554-2 may be configured to allow the stanchions to pass therethrough. For example, as shown in FIG. 4E, which is a partial exploded view of the support member 550 showing that the various plates associated with the support member 550, each of the first, second, third, and fourth side plates 552-1, 552-2, 554-1, and 554-2 may include cutouts, for example, half circles, therein to allow the stanchions of the pivot member 510 to pass therethrough.

In this particular nonlimiting example embodiment, a first and second stiffener plate 562 and 564 may be provided in the support member 550. As shown in the figures, the stiffener plates 562 and 564 may be inclined. Thus, in example embodiments, the stiffener plates 562 and 564 may be arranged so as to cradle the pivot member 510 when the pivot member is at a first position A' as shown in FIG. 4C-1 and a second position B' as shown in FIG. 4C-2. Thus, the stiffener plates 562 and 564 may not only add strength to the support member 550 but may also restrict a motion of the pivot member 510 as well as support the pivot member 510.

As in the previous example, the support member 550 may include end walls 556 and 558 fitted with stanchions 570 and 572 to allow the frame to be pivotally connected to an external structure. The end walls 556 and 558 may be considered third and fourth walls of the support member 550. For example, referring to 4F, an external structure may include a first plate 1200 and a second plate 1300. The first plate 1200 may include an aperture 1210 configured to accommodate the first stanchion 570 and the second plate 1300 may include an aperture 1310 configured to accommodate the second stanchion 572. For example, the first aperture 1210 may be a circular hole having a diameter about the same size, or slightly larger than, a diameter of the first stanchion 570. Likewise, the second aperture 1310 may be a circular hole having a diameter about the same size as, or slightly larger than, the second stanchion 572.

Figure 4G:
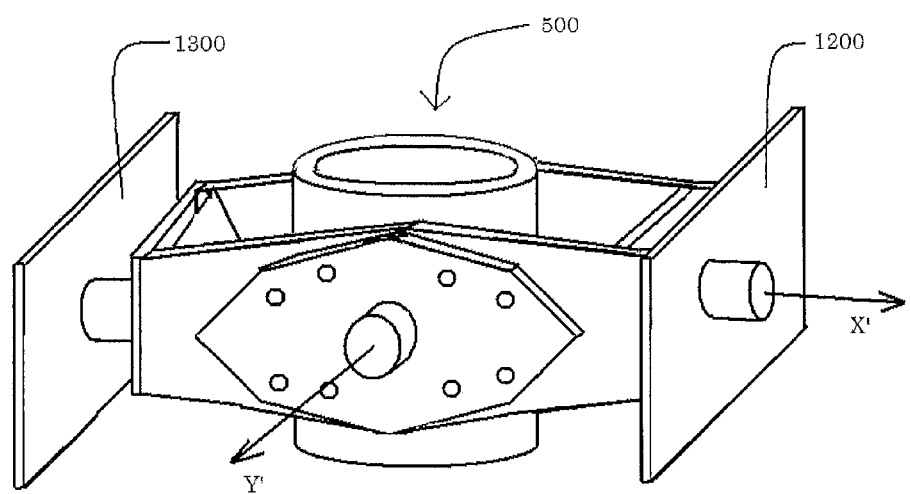
FIG. 4G is a view of the coupling device in accordance with example embodiments supported by the two plates.

FIG. 4G shows the coupling device 500 coupled with the first and second plates 1200 and 1300 of the external structure. In FIG. 4G, the coupling device 500 coupled to the first and second plates 1200 and 1300 provide another example of a system. From a mechanics standpoint, the coupling device 500 is free to rotate about the X' axis illustrated in FIG. 4G and the pivot member 510 of the coupling device 500 is free to rotate about the axis Y' illustrated in FIG. 4G. Thus, the pivot member 510, is able to rotate both about the Y' and X' axis by virtue of its connection to the support member 550 and the supporting member's 550 connection to the first and second plates 1200 and 1300. In example embodiments if the first plate 1200 of the external structure were to twist about the X' axis, very little to no torsional load would be transferred from to the first plate 1200 to the coupling device 500 since the first plate 1200 is free to twist about the first stanchion 570 of the support member 550. This, again, is a significant advantage over the prior art in that prior art couplers rigidly connected to a plate would experience a significant loading from the plate. As explained earlier, such loads may create severe stresses in the prior art couplers leading to their failure and/or decreased service life. However, because the coupling device 500 of example embodiments includes an extra degree of freedom by virtue of the third an fourth stanchions 570 and 572, the coupling device 500 of example embodiments is less prone to overload.

Figure 4H:
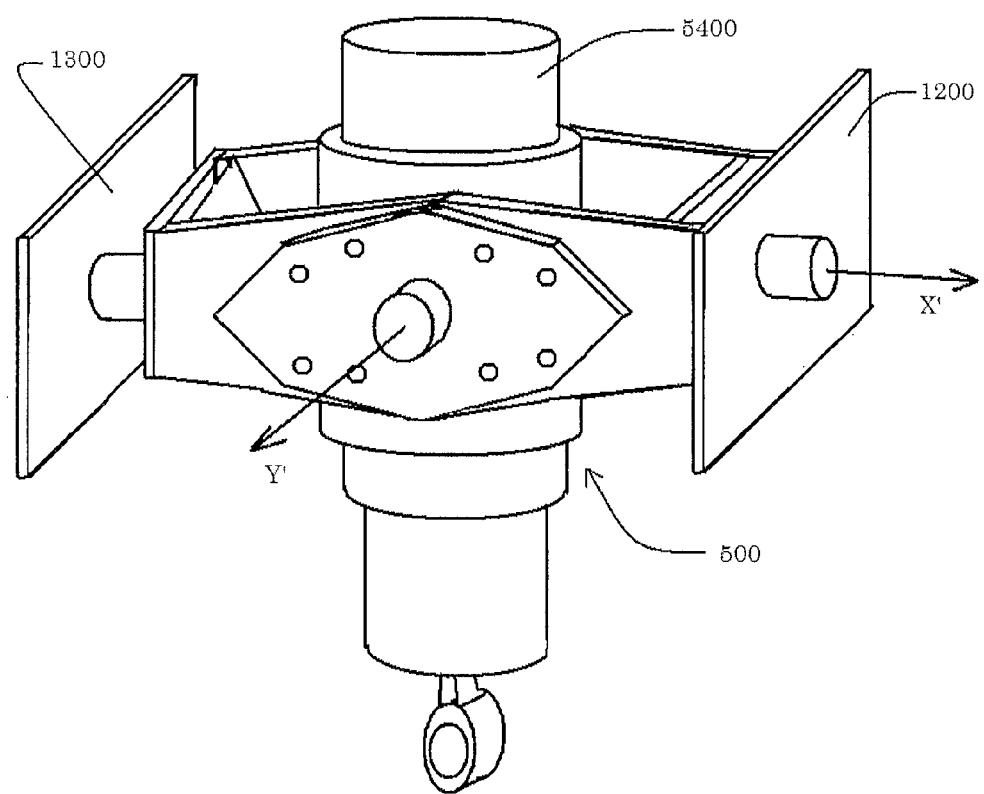
FIG. 4H is a view of the coupling device in accordance with example embodiments supported by the two members of an external structure, the coupling device supporting an actuating device.

FIG. 4H is a view of the coupling device 500 connected to an external structure. In this particular nonlimiting example, the coupling device 500 supports an actuating device 5400. The actuating device 5400 may, for example, be a hydraulic or pneumatic cylinder. For example, the coupling device 500 may have a barrel of a hydraulic cylinder inserted into the pivot member 510. Thus, the body of the pivot member 510 may function as a sleeve in which a standard cylinder may be inserted. In example embodiments, a diameter of the hydraulic cylinder may be substantially the same as, or slightly smaller than, an inner diameter of the pivot member 510. Thus, the barrel of the hydraulic cylinder may be slid into the pivot member 510 of the coupling device 100. Furthermore, the barrel of the actuating device 5400 may be secured to the pivot member 510 by at least one of welding, clamping, or pinning. Thus, the coupling device 500 may be used to couple an actuating device 5400 to an external structure. Although example embodiments illustrate the coupling device 500 as being coupled to a barrel of an actuating device, example embodiments are not limited thereto. For example, the coupling device 500 may, in the alternative, be attached to a rod of the actuating device 5400.

As indicated previously, the invention is not limited by the aforementioned arrangement. For example, in example embodiments the support member 550 (which may also be considered a frame) is illustrated as including the third stanchion 570 and the fourth stanchion 572 which penetrate the third aperture 1210 and the fourth aperture 1310 of the first and second plates 1200 and 1300. However, rather than providing third and fourth stanchions 570 and 572 on the support member 550, the third and fourth stanchions 570 and 572 may be provided on the first and second plates 1200 and 1300. Likewise, rather than providing third and fourth apertures 1210 and 1310 in the first and second plates 1200 and 1300, the third and fourth apertures 1210 and 1310 may be provided in the end walls 556 and 558 of the support member 550. Thus, in example embodiments, the first and second plates 1200 and 1300 may include stanchions that protrude into holes formed in the support member 550 to pivotally support the coupling device 500, In FIGS. 4A-4H, the coupling device 500 was illustrated as including a first wall 552 and a second wall 554. The first wall 552 was described as including a first side plate 552-1 and a second side plate 552-2 bolted together via a first cover plate 552-3 and a first plurality of bolts 552-4. Similarly, the second wall 554 was described as including a third side plate 554-1 and a fourth side plate 554-3 bolted together via a second cover plate 554-3 and a second plurality of bolts 554-4. Example embodiments, however, are not limited thereto. For example, rather than bolting together three members (552-1, 552-2, and 552-3) to form the first wall 552, the first wall 552 may be formed by bolting together two members. For example, as shown in 5A, rather than providing a first side plate 552-1 and a second side plate 552-2, a single member 552* may be provided. The single member 552* may include a plurality of apertures through which the first plurality of bolts 552-4 may pass to bolt the single member 552* to the first cover plate 552-3. Similarly, as shown in FIG. 5B rather than providing a third side plate 554-1 and a fourth side plate 554-2, a single member 554* may be provided. The single member 554* may include a plurality of apertures through which the second plurality of bolts 554-4 may pass to bolt the single member 554* to the second cover plate 552-3. FIG. 5B illustrates an exploded view of a coupling device using the single members 552* and 554*. In example embodiments, each of the single members 552* and 554* may include a relatively large aperture and a slot. The relatively large apertures may resemble a circular opening through which the stanchions of the pivot member 510 may be inserted.

Figure 5A:
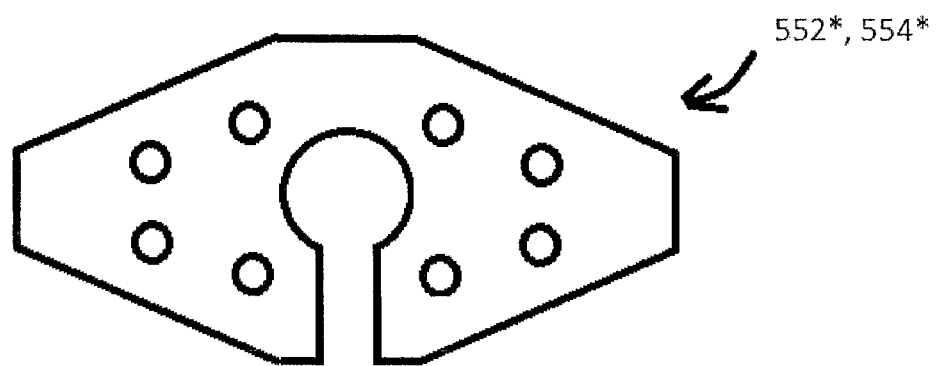
FIGS. 5A and 5B are views of a single member usable in a wall of a coupling device in accordance with example embodiments.
Figure 5B:
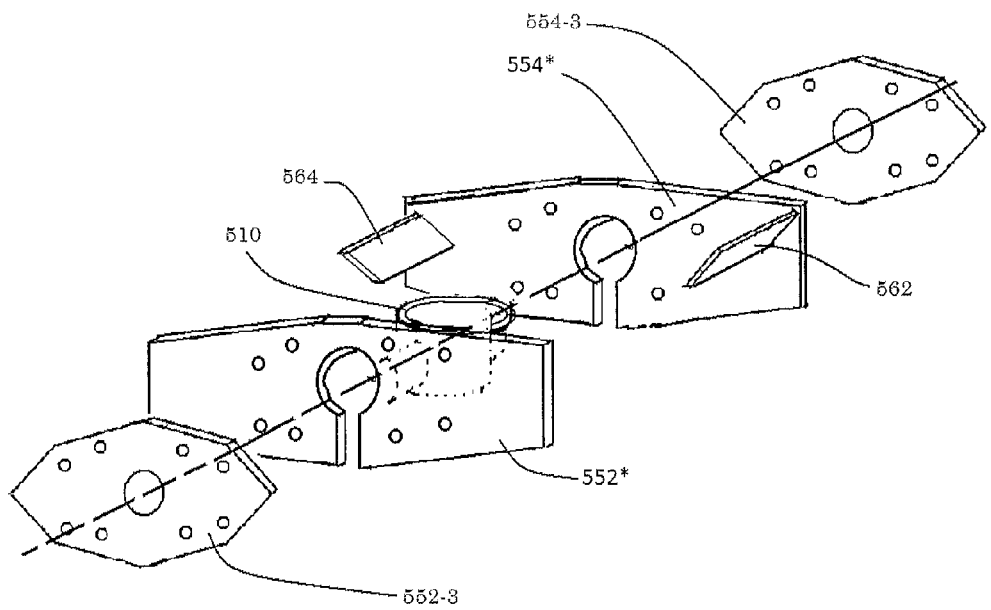
Figure 6A:
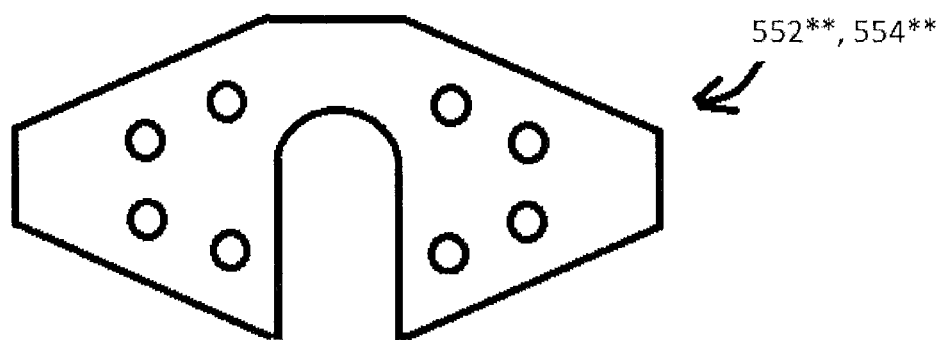
FIGS. 6A and 6B are views of a single member usable in a wall of a coupling device in accordance with example embodiments.
Figure 6B:
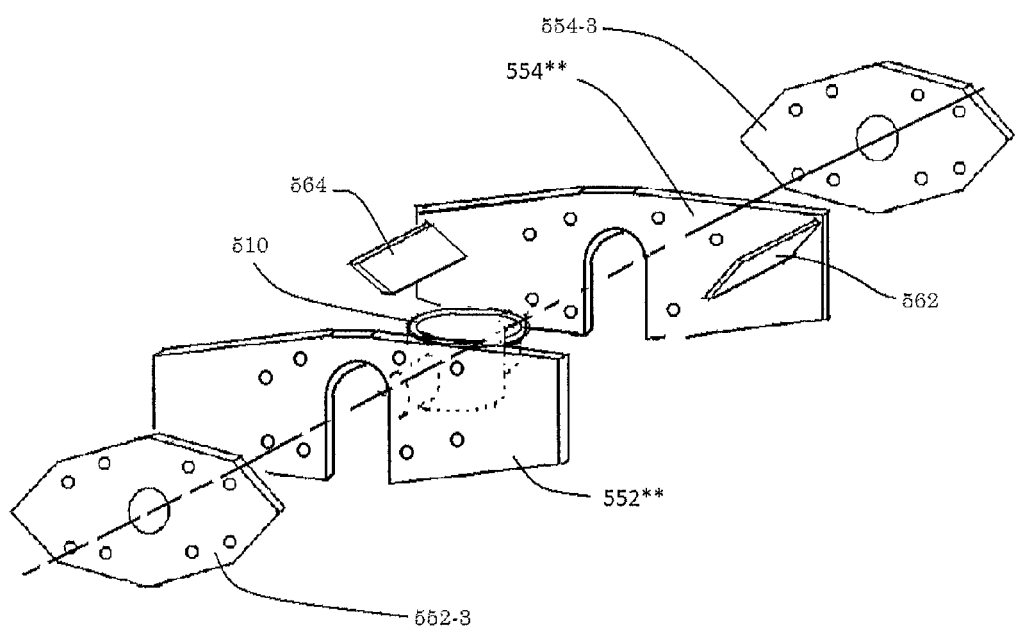

In FIGS. 5A-5B the single members 552* and 554* are illustrated as including a plurality of holes through which pluralities of bolts 552-4 and 554-4 may pass. The single members 552* and 554* also include a relatively large aperture and a slotted aperture. In FIGS. 5A-5B, the relatively large aperture is illustrated as a circular aperture having a diameter larger than a width of the slotted aperture. Example embodiments, however, are not limited thereto. For example, as shown in FIGS. 6A and 6B, a width of the slotted aperture may be about the same size as a width of the relatively large aperture. FIG. 6B illustrates an exploded view of a coupling device using the single members 552 and 554 wherein the width of the slot is about the same as the width of the larger aperture.

Figure 7A:
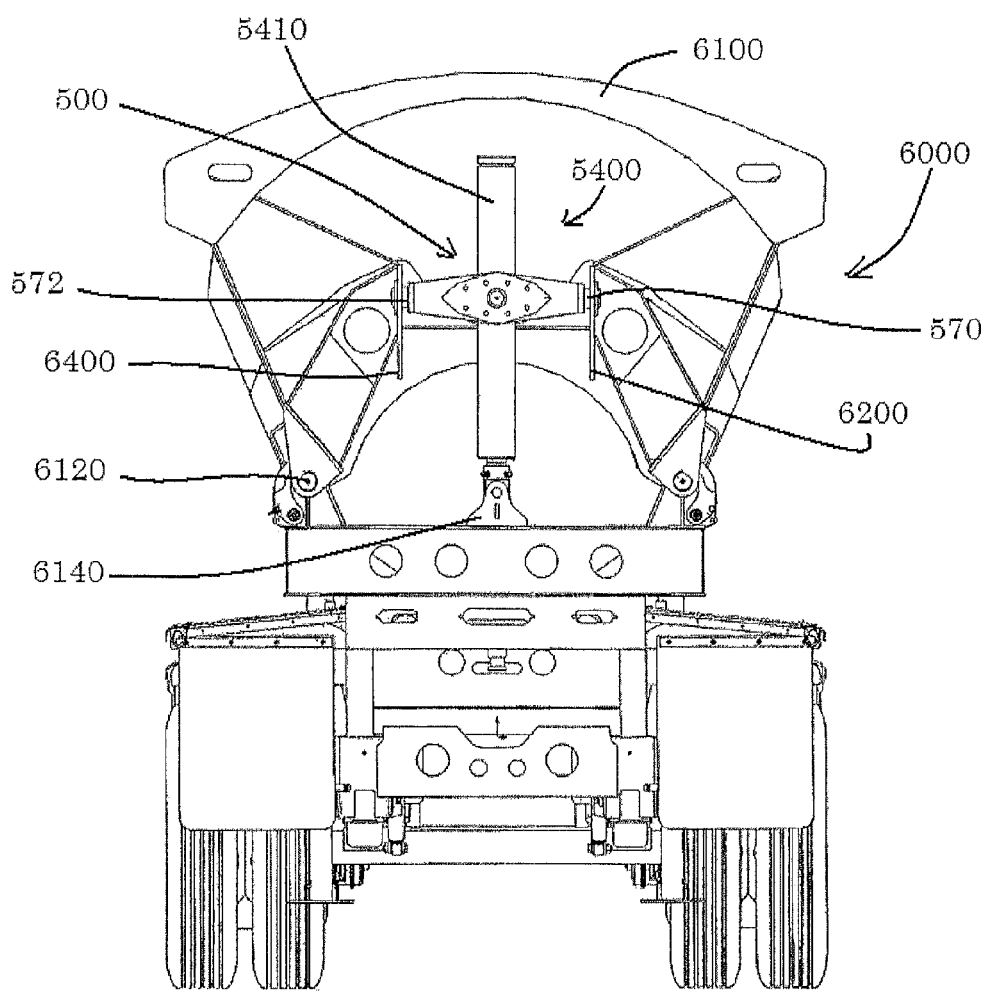
FIGS. 7A and 7B are views of a side dump trailer in accordance with example embodiments.

FIG. 7A illustrates a back view of a side dump trailer 6000 which implements the coupling member 500 according to example embodiments. The side dump trailer 6000 is used to transport a tub 6100 that is attached to the side dump trailer 6000 at a pivot point 6120. The side dump trailer 6000 further includes an actuating device 5400 attached to the back end of the side dump trailer 6000 by a bracket 6140. In this particular nonlimiting example, the actuating device 5400 is illustrated as a hydraulic cylinder, however, example embodiments are not limited thereto. For example, another nonlimiting example of the actuating device 5400 may be a pneumatic cylinder. In this particular nonlimiting example embodiment, the stanchions 570 and 572 of the coupling member 500 are connected to a first plate 6200 and a second plate 6400 which are arranged on the back of the dump trailer 6000. As shown in FIG. 7A, the first plate 6200 and the second plate 6400 may be arranged parallel with one another. In addition, though not shown in the figures, the first plate 6200 and the second plate 6400 may include holes configured to receive the third and fourth stanchions 570 and 572 of the coupling member. Thus, the first and second plates 6200 and 6400 are analogous to the earlier described first and second plates 1200 and 1300.

As mentioned above, in this particular nonlimiting example embodiment, the actuating member 5400 is illustrated as a hydraulic cylinder. More specifically, FIG. 7A illustrates the barrel of the hydraulic cylinder as being supported by the coupling member 500. Example embodiments, however, are not limited by this feature. For example, actuating member 5400 may be a hydraulic cylinder and the coupling member 500 may, instead, be supporting a rod of a hydraulic cylinder.

Figure 7B:
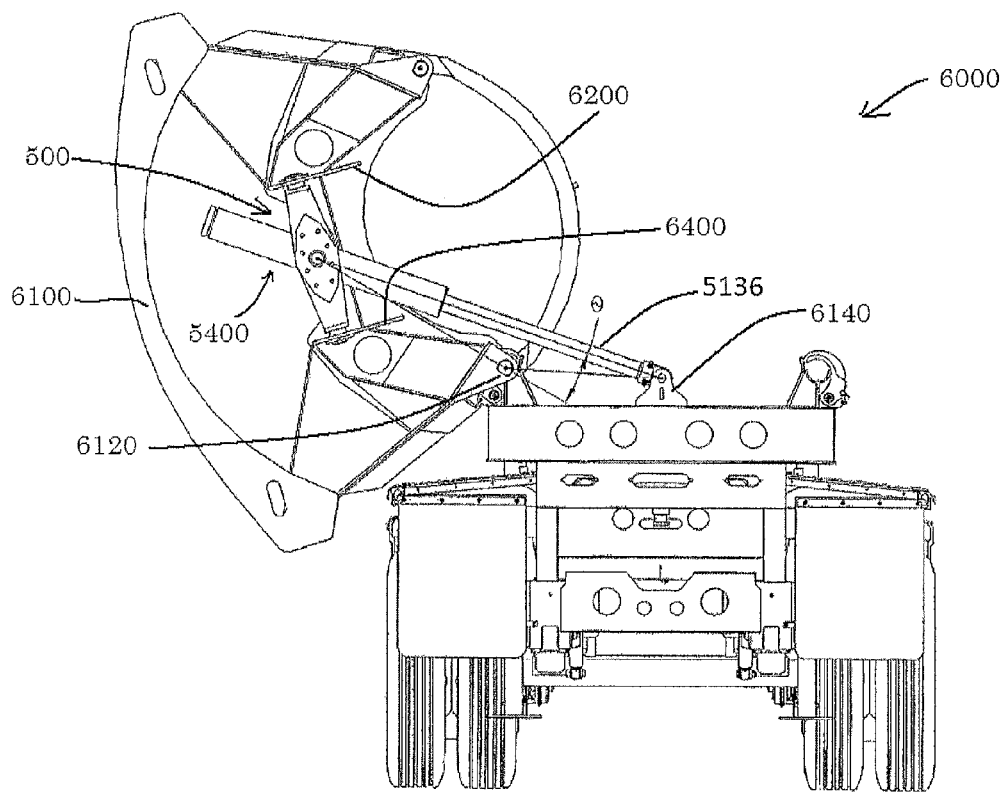

FIG. 7B illustrates the side dump trailer 6000 with the actuating member 5400 extended thus allowing a rod 5136 of the actuating member to be seen (assuming the actuating member 5400 is a hydraulic or pneumatic cylinder). Because of the manner in which the actuating member 5400 is attached to the coupling member 500 (via the stanchions of the pivot member 510) the actuating member 5400 may rotate with respect to the coupling member 500 as the tub 6100 is tilted.

As explained earlier, the applicants have discovered that the tub 6100 may twist in the event the tub 6100 is relatively long and/or the load is relatively high. However, in example embodiments, because the coupling member 500 is pivotally connected to the tub through the stanchions 570 and 572, the tub 6100 may twist without imparting significant loading to the coupling member 500. Thus, the coupling member 500 of example embodiments, and the side load dumping unit employing the coupling member 500 offer a significant advantage over the conventional art.

While example embodiments have been particularly shown and described with reference to example embodiments thereof, it will be understood by those of ordinary skill in the art that various changes in form and details may be made therein without departing from the spirit and scope of the invention.

What I claim is:

1. A side dump trailer comprising:
   a tub;
   a first structure on the tub;
   a second structure on the tub;
   a coupling device supported by the first structure and the second structure, the coupling device including a pivot member and a support member, the pivot member being configured to pivot about a first axis and the support member being configured to pivot about a second axis; and
   an actuator attached to the pivot member, wherein the first axis and second axis are substantially perpendicular to each other and wherein longitudinal centerlines of the pivot member and the actuator are substantially coincident, the actuator and the pivot member being arranged on a sidewall of the tub.

2. The side dump trailer of claim 1, wherein the first structure includes a first hole and the second structure includes a second hole and the coupling device includes a first stanchion penetrating the first hole and a second stanchion penetrating the second hole.

3. The side dump trailer of claim 2, wherein the pivot member includes a third stanchion penetrating a first wall of the coupling device and a fourth stanchion penetrating a second wall of the coupling device.

4. The side dump trailer of claim 3, wherein the first, second, third and fourth stanchions are arranged such that a line passing through the first and second stanchions is substantially perpendicular to a line passing through the third and fourth stanchions.

5. The side dump trailer of claim 1, wherein the actuator is one of a single pneumatic and a single hydraulic cylinder.

6. The side dump trailer of claim 1, wherein the first and second structures are a pair of parallel plates.

7. The side dump trailer of claim 6, wherein the support member is configured to pivot about a line that is perpendicular to the pair of parallel plates.

8. The side dump trailer of claim 1, wherein the support member is configured to pivot about a line which is substantially parallel to a major surface of the tub that forms one of the tub's back and front ends.

9. The side dump trailer of claim 1, wherein the actuator is attached to a frame of the trailer.

10. The side dump trailer of claim 9, wherein the tub is configured to pivot about a point arranged at a side of the tub so that when the actuator is operated the tub pivots about the pivot point.

* * * * *